US006404703B1

(12) United States Patent
Burrell

(10) Patent No.: US 6,404,703 B1
(45) Date of Patent: Jun. 11, 2002

(54) METHOD AND APPARATUS FOR DISTANCE MEASUREMENT

(75) Inventor: Christopher Simon Burrell, Leeds (GB)

(73) Assignee: The Guide Dogs for the Blind Association, Reading (GB)

(*) Notice: Subject to any disclaimer, the term of this patent is extended or adjusted under 35 U.S.C. 154(b) by 0 days.

(21) Appl. No.: 09/180,739
(22) PCT Filed: May 9, 1997
(86) PCT No.: PCT/GB97/01271
§ 371 (c)(1),
(2), (4) Date: Jul. 6, 1999
(87) PCT Pub. No.: WO97/43661
PCT Pub. Date: Nov. 20, 1997

(30) Foreign Application Priority Data

May 14, 1996 (GB) .............................. 9610094

(51) Int. Cl.$^7$ .............................. G01S 11/16
(52) U.S. Cl. ...................... 367/128; 367/127
(58) Field of Search .............. 367/128, 127, 367/118; 340/825.54; 342/128, 129, 130

(56) References Cited

U.S. PATENT DOCUMENTS

| 3,566,348 A | * | 2/1971 | Leyden et al. ............... 367/127 |
| 3,953,856 A | | 4/1976 | Hammack |
| 4,055,830 A | | 10/1977 | Wilson et al. |
| 4,207,571 A | * | 6/1980 | Passey ........................ 367/128 |
| 4,234,942 A | | 11/1980 | Prause et al. |
| 4,313,183 A | | 1/1982 | Saylors |
| 4,694,295 A | | 9/1987 | Miller et al. |
| 4,706,286 A | * | 11/1987 | Sturza .......................... 380/34 |
| 5,191,328 A | | 3/1993 | Nelson |
| 5,528,232 A | * | 6/1996 | Verma et al. ................ 367/128 |

FOREIGN PATENT DOCUMENTS

| DE | 4407456 | 3/1994 |
| EP | 0305780 | 8/1988 |
| GB | 2170907 | 8/1986 |
| JP | 2213236 | 8/1990 |
| JP | 5199566 | 8/1993 |

OTHER PUBLICATIONS

Horowitz, Paul et al.: "The Art of the Electronics" 1989, Cambridge University Press, New York, US XP002039479, line 4–right–hand column, line 9.

* cited by examiner

Primary Examiner—Ian J. Lobo
(74) Attorney, Agent, or Firm—Bliss McGlynn & Nolan, P.C.

(57) ABSTRACT

A method and apparatus for distance measurement is disclosed in which first and second signals having different propagation speeds are transmitted between a transmitter (2) at a first location and a receiver (3) at a second location. The distance between the first and second locations is determined from the difference in propagation time between the first and second signals.

34 Claims, 3 Drawing Sheets

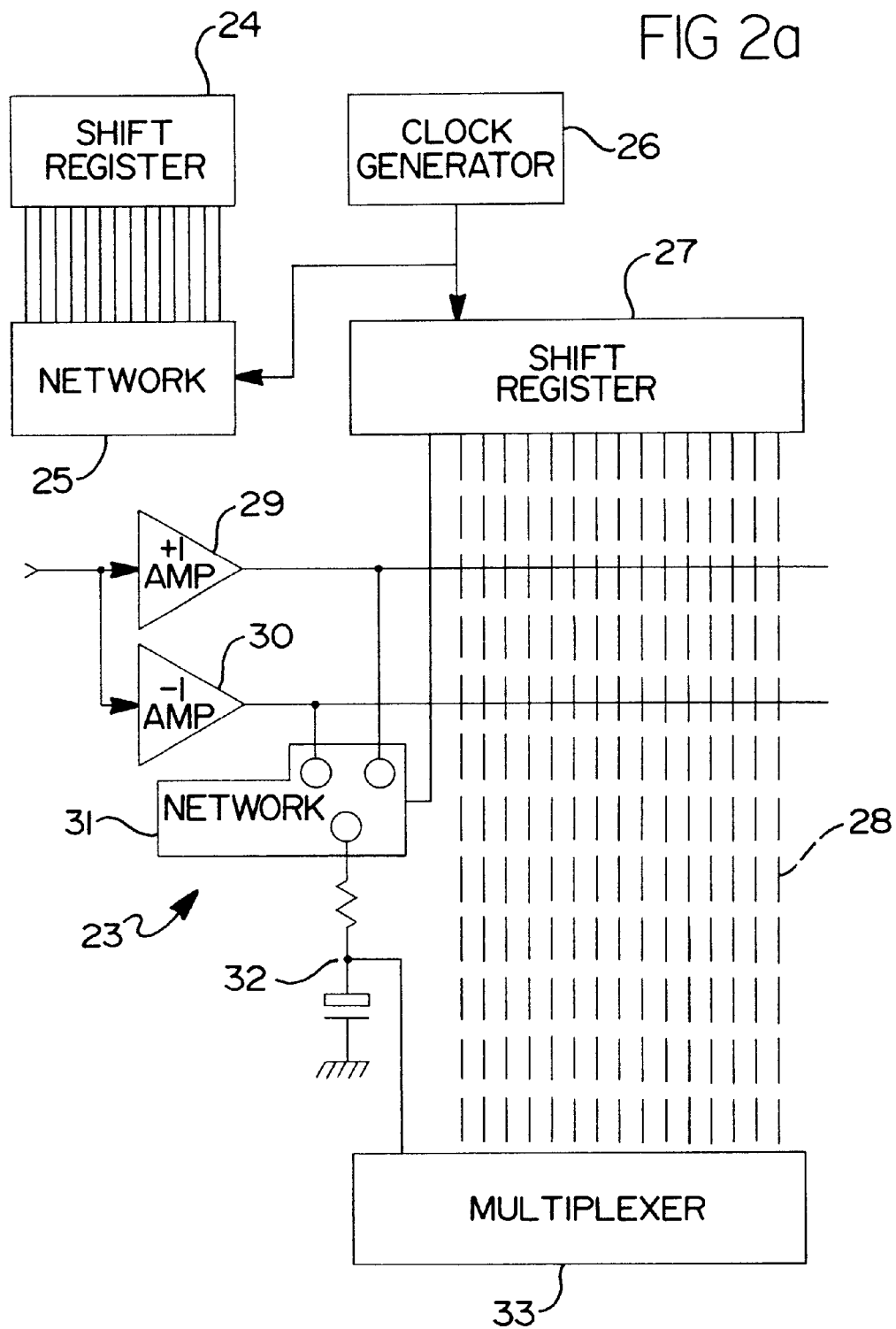

METHOD AND APPARATUS FOR DISTANCE MEASUREMENT

BACKGROUND OF THE INVENTION

1. Field of the Invention

The present invention relates to a method and apparatus for distance measurement.

2. Description of the Related Art

Distance measurement techniques exist in which acoustic signals in the ultra-sonic range are transmitted in the form of short pulses by a narrow band transmitter and are detected by a sensor. In such devices, the interval between pulses must be longer than the time taken for the ultra-sonic signal to travel between the transmitter and the detector in order to avoid ambiguity in pulses detected at the sensor. This in turn limits the distance over which the device can be used or the speed of response.

Preferred embodiments of the present invention seek to overcome the above drawback of the prior art.

SUMMARY OF THE INVENTION

According to an aspect of the present invention, there is provided a distance measuring method comprising the steps of transmitting between at least one pair of first and second locations a respective ultrasonic signal, transmitting between the or each pair of first and second locations a respective radio frequency signal, and determining the distance between the first and second locations of the or each said pair of first and second locations from the difference in propagation time between said ultrasonic and radio frequency signals.

The method may further comprise the step of rotating the or each said ultrasonic signal. This may be achieved by mechanical means such as a motor or electronic means such as a phased array of transmitters.

This provides the advantage of enabling a position vector between a transmitter and a detector to be determined.

The or each said ultrasonic and radio frequency signal may be emitted from a respective first location and detected at a respective second location. Alternatively, the ultrasonic and radio frequency signals may be emitted from different locations, and suitable means used to exchange information between the locations.

Preferably, the or each said ultrasonic signal includes a respective first modulation signal having a repetition period longer than the propagation time of said ultrasonic signal between the respective first and second locations.

By providing a first modulation signal having a repetition period long compared with the propagation time of the respective ultrasonic signal, the detected wave form of the first modulation signal provides a unique indication of the time delay between transmission and detection of the said ultrasonic signal, thus avoiding by relatively simple means the problems of ambiguity associated with the prior art.

In a preferred embodiment, the or each said radio frequency signal includes a respective second modulation signal associated with said first modulation signal.

By providing one or more second modulation signals related to the respective first modulation signals, this has the advantage of enabling synchronisation by relatively simple means between the respective transmitters and detectors.

Preferably, the step of detecting the or each said radio frequency signal further comprises deriving the respective second modulation signal, generating at the respective second location a plurality of reference signals corresponding to the respective first modulation signals delayed by substantially constant time intervals relative to each other, and comparing a signal derived from the or each said detected ultrasonic signal with each of the plurality of reference signals.

This provides the advantage that by having a sufficient number of reference signals at the or each second location, detection of substantial correlation between the signals derived from the respective ultrasonic signals and the reference signals indicates the approximate time delay between receipt of respective ultrasonic and radio frequency signals. This in turn provides the advantage that sophisticated memory devices are not required in order to determine the difference in propagation time between respective ultrasonic and radio frequency signals.

In a preferred embodiment, the step of generating said reference signals comprises generating respective first modulation signals at the or each second location and inputting each said first modulation signal to a respective shift register having a plurality of outputs.

The method may further comprise the step of determining a degree of correlation between the or each signal derived from the detected ultrasonic signal and each reference signal.

This provides the advantage that when the difference in transmission time between respective ultrasonic and radio frequency signals lies between two of the intervals corresponding to the reference signals, this is readily indicated by correlation between the signal derived from the detected ultrasonic signal and two of the reference signals.

In a preferred embodiment, the or each said ultrasonic signal is sequentially transmitted at two carrier frequencies, and said carrier frequencies are selected according to the respective first modulating signal.

Preferably, the or each said first modulation signal is a pseudo-random bit sequence By providing the or each said first modulation signal in the form of a pseudo-random bit sequence, this has the advantage of enabling a signal suitable for modulation purposes to be produced by relatively simple means and which is suitable for convenient processing by digital circuitry.

The time interval between successive bits of the pseudo-random bit sequence may be a multiple of the periods corresponding to the carrier frequencies, which are preferably substantially 39.6 kHz and substantially 40.4 kHz.

This provides the advantage that in a device of chip width (the time from generating one bit of a digital sequence to the next bit) of 2.5 ms, there are exactly 101 cycles of 40.4 kHz and 99 cycles of 39.6 kHz in one chip. As a result, the two frequencies have the same leading edge where the new chip of the sequence is sent, with the advantage that the transmission of the ultrasonic signal is continuous and has no harmonics.

The method preferably further comprises the step of transmitting a third signal from at least one said second location to a said first location to activate emission of said ultrasonic and radio frequency signals.

This provides the advantage of enabling the transmitters to use a power save mode.

According to another aspect of the present invention, there is provided a transmitter for a distance measurement system, the transmitter comprising a first emitter for emitting an ultrasonic signal, a second emitter for emitting a radio frequency signal, and control means for controlling the delay between emission of said ultrasonic and radio frequency signals.

The transmitter may comprise means for rotating said ultrasonic signal.

Preferably, the transmitter further comprises first modulating means for modulating said ultrasonic signal by a first modulation signal having a repetition period longer than the propagation time of the ultrasonic signal from the first emitter to a detector.

In a preferred embodiment, the first emitter in use emits the ultrasonic signal sequentially at two frequencies selected according to the first modulation signal.

Preferably, the first modulation signal is a pseudo-random bit sequence.

The time interval between successive bits of the pseudo-random bit sequence may be a multiple of the periods corresponding to the two frequencies.

The transmitter may further comprise signal generating means for generating the first modulating signal.

In a preferred embodiment, the signal generating means comprises at least one shift register for receiving the seed of the pseudo-random bit sequence and a gate network connected to an output of the shift register.

Preferably, the gate network comprises a plurality of XOR gates.

In a preferred embodiment, the transmitter further comprises second modulating means for modulating the radio frequency signal with the seed of the pseudo-random bit sequence.

This provides the advantage of enabling a similar pseudo-random bit sequence to be generated at a detector and synchronised with that of the transmitter.

In a preferred embodiment, the transmitter may have an inactive mode in which said ultrasonic and radio frequency signals are not emitted, and may further comprise detector means for detecting a third signal and actuating emission of said ultrasonic and radio frequency signals in response thereto.

According to a further aspect of the present invention, there is provided a detector apparatus for a distance measuring system, the apparatus comprising a first detector for detecting an ultrasonic signal, a second detector for detecting a radio frequency signal, and means for determining a transmitter-detector distance from the time interval between detection of said ultrasonic and radio frequency signals.

In a preferred embodiment, the first detector in use detects a first modulation signal having a repetition period longer than a transmitter-detector time of the ultrasonic signal.

The apparatus preferably comprises frequency discriminator means for detecting the ultrasonic signal transmitted sequentially at two frequencies selected according to the first modulation signal.

Preferably, the first modulation signal is a pseudo-random bit sequence, and the second modulation signal includes the seed of said pseudo-random bit sequence.

The time interval between successive bits of the pseudo-random bit sequence may be a multiple of the periods corresponding to the two frequencies.

In a preferred embodiment, the frequency discriminator means comprises a phase locked loop.

In a preferred embodiment, the second detector in use detects a second modulation signal associated with the first modulation signal.

The determining means may comprise processor means for generating a plurality of reference signals corresponding to the first modulating signal delayed by substantially constant time intervals relative to each other, and comparing the detected first modulating signal with each of said plurality of reference signals.

In a preferred embodiment, the processor, comprises a shift register for receiving the seed of the pseudo-random bit sequence and a gate network for generating the pseudo-random bit sequence therefrom.

Preferably, the gate network comprises a plurality of XOR gates.

The processor may evaluate a degree of correlation between the first modulation signal and each of the plurality of reference signals.

In a preferred embodiment, the processor comprises a micro computer.

According to a further aspect of the present invention, there is provided a distance measuring system comprising at least one transmitter as defined above and at least one detector apparatus as defined above.

According to a further aspect of the present invention, there is provided a distance measuring method comprising the steps of transmitting between at least one pair of first and second locations a respective first signal having a first propagation speed, transmitting between the or each pair of first and second locations a respective second signal having a second propagation speed higher than the first propagation speed, and determining the distance between the first and second locations of the or each said pair of first and second locations from the difference in propagation time between said first and second signals, wherein the or each said first signal includes a respective first modulation signal comprising a pseudo-random bit sequence having a repetition period longer than the propagation time of said first signal between the respective first and second locations and the or each said second signal includes a respective second modulation signal comprising the seed of the pseudo-random bit sequence.

The method may further comprise the step of rotating the or each said first signal. This may be achieved by mechanical means such as a motor or electronic means such as a phased array of transmitters.

This provides the advantage of enabling a position vector between a transmitter and a detector to be determined.

The or each said first and second signal may be emitted from a respective first location and detected at a respective second location. Alternatively, the first and second signals may be emitted from different locations, and suitable means used to exchange information between the locations.

Preferably, the step of detecting the or each said second signal further comprises deriving the respective second modulation signal, generating at the respective second location a plurality of reference signals corresponding to the respective first modulation signals delayed by substantially constant time intervals relative to each other, and comparing a signal derived from the or each said detected first signal with each of the plurality of reference signals.

This provides the advantage that by having a sufficient number of reference signals at the or each second location, detection of substantial correlation between the signals derived from the respective first signals and the reference signals indicates the approximate time delay between receipt of respective first and second signals. This in turn provides the advantage that sophisticated memory devices are not required in order to determine the difference in propagation time between respective first and second signals.

In a preferred embodiment, the step of generating said reference signals comprises generating respective first modulation signals at the or each second location and inputting each said first modulation signal to a respective shift register having a plurality of outputs.

The method may further comprise the step of determining a degree of correlation between the or each signal derived from the detected first signal and each reference signal.

This provides the advantage that when the difference in transmission time between respective first and second signals lies between two of the intervals corresponding to the reference signals, this is readily indicated by correlation between the signal derived from the detected first signal and two of the reference signals.

In a preferred embodiment, the or each said first signal is sequentially transmitted at two carrier frequencies, and said carrier frequencies are selected according to the respective first modulating signal.

The time interval between successive bits of the pseudo-random bit sequence may be a multiple of the periods corresponding to the carrier frequencies, which are preferably substantially 39.6 kHz and substantially 40.4 kHz.

This provides the advantage that in a device of chip width (the time from generating one bit of a digital sequence to the next bit) of 2.5 ms, there are exactly 101 cycles of 40.4 kHz and 99 cycles of 39.6 kHz in one chip. As a result, the two frequencies have the same leading edge where the new chip of the sequence is sent, with the advantage that the transmission of the first signal is continuous and has no harmonics.

The method preferably further comprises the step of transmitting a third signal from at least one said second location to a said first location to activate emission of said first and second signals.

This provides the advantage of enabling the transmitters to use a power save mode.

Preferably, the or each said first signal is an acoustic signal, and preferably an ultra-sonic signal.

In preferred embodiment, the or each said second signal is an electro-magnetic signal, optical or a radio frequency signal.

According to another aspect of the present invention, there is provided a transmitter for a distance measurement system, the transmitter comprising a first emitter for emitting a first signal having a first propagation speed, a second emitter for emitting a second signal having a second propagation speed higher than the first propagation speed, control means for controlling the delay between emission of said first and second signals, first modulating means for modulating said first signal by a first modulation signal comprising a pseudo-random bit sequence having a repetition period longer than the propagation time of the first signal from the first emitter to a detector, and second modulating means for modulating the second signal with the seed of the pseudo-random bit sequence.

The transmitter may comprise means for rotating said first signal.

In a preferred embodiment, the first emitter in use emits the first signal sequentially at two frequencies selected according to the first modulation signal.

The time interval between successive bits of the pseudo-random bit sequence may be a multiple of the periods corresponding to the two frequencies.

The transmitter may further comprise signal generating means for generating the first modulating signal.

In a preferred embodiment, the signal generating means comprises at least one shift register for receiving the seed of the pseudo-random bit sequence and a gate network connected to an output of the shift register.

Preferably, the gate network comprises a plurality of XOR gates.

In a preferred embodiment, the transmitter may have an inactive mode in which said first and second signals are not emitted, and may further comprise detector means for detecting a third signal and actuating emission of said first and second signals in response thereto.

The first emitter preferably comprises means for emitting an acoustic, and preferably an ultra-sonic, signal.

The second emitter preferably comprises means for emitting an electromagnetic, optical or radio frequency signal.

According to a further aspect of the present invention, there is provided a detector apparatus for a distance measuring system, the apparatus comprising a first detector for detecting a first signal having a first propagation speed, a second detector for detecting a second signal having a second propagation speed higher than the first propagation speed, and means for determining a transmitter-detector distance from the time interval between detection of said first and second signals, wherein the first detector in use detects a first modulation signal comprising a pseudo-random bit sequence having a longer repetition period than a transmitter-detector propagation time of the first signal, and the second detector in use detects a second modulation signal comprising the seed of the pseudo-random bit sequence.

The apparatus preferably comprises frequency discriminator means for detecting the first signal transmitted sequentially at two frequencies selected according to the first modulation signal.

The time interval between successive bits of the pseudo-random bit sequence may be a multiple of the periods corresponding to the two frequencies.

In a preferred embodiment, the frequency discriminator means comprises a phase locked loop.

The determining means may comprise processor means for generating a plurality of reference signals corresponding to the first modulating signal delayed by substantially constant time intervals relative to each other, and comparing the detected first modulating signal with each of said plurality of reference signals.

In a preferred embodiment, the processor comprises a shift register for receiving the seed of the pseudo-random bit sequence and a gate network for generating the pseudo-random bit sequence therefrom.

Preferably, the gate network comprises a plurality of XOR gates.

The processor may evaluate a degree of correlation between the first modulation signal and each of the plurality of reference signals.

In a preferred embodiment, the processor comprises a micro computer.

According to a further aspect of the present invention, there is provided a distance measuring system comprising at least one transmitter as defined above and at least one detector apparatus as defined above.

BRIEF DESCRIPTION OF THE DRAWINGS

Preferred embodiments of the present invention will now be described, by way of example only and not in any limitative sense, with reference to the accompanying drawings, in which:

FIG. 2a shows an alternative arrangement to replace the micro computer of FIG. 1; and FIG. 2b shows a correlation chart derived by the apparatus of FIG. 2a.

DESCRIPTION OF THE PREFERRED EMBODIMENT(S)

Figure 1:
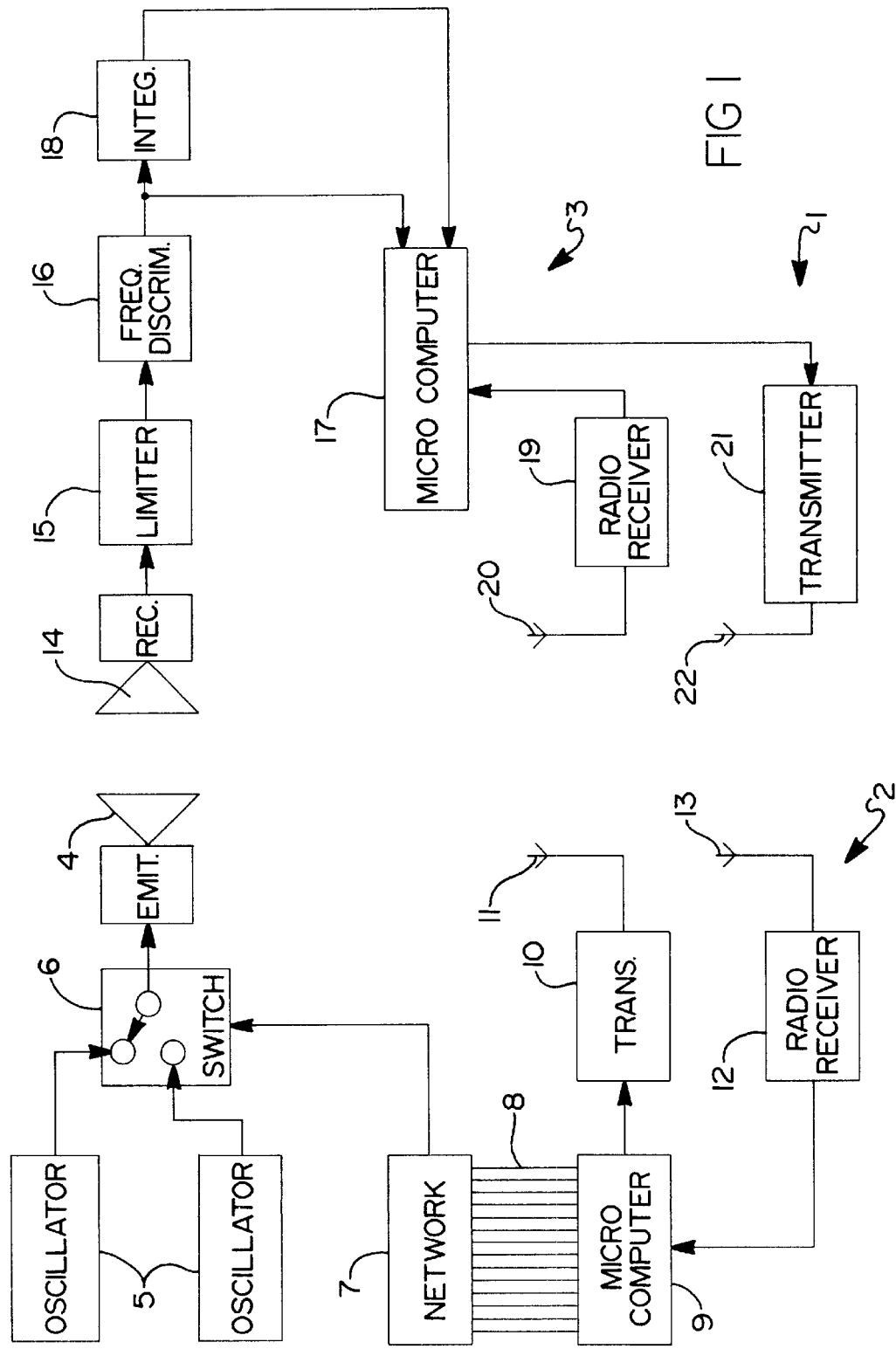
FIG. 1 shows a distance measuring system embodying the present invention.

Referring to FIG. 1, there is shown a distance measuring system 1 to aid the visually impaired. The distance measuring system 1 comprises one or more transmitters 2 (of which only one is shown in FIG. 1) and one or more receivers 3 (of which only one is also shown), the transmitters 2 being arranged at fixed locations and each receiver 3 being carried by a visually impaired person.

The transmitter comprises an ultra-sonic emitter 4 connected to a pair of oscillators 5 for generating signals at frequencies of 39.6 and 40.4 kilohertz respectively, via respective outputs of a digital switch 6. The frequencies of the oscillators S are sufficiently close together that a narrow band width transmitter can be used.

By using ultra-sonic frequencies of 39.6 kHz and 40.4 kHz, if the chip width is 2.5 ms, then there are exactly 101 cycles at 40.4 kHz and 99 cycles of 39.6 kHz in one chip. This enables the two frequencies to be made to have the same leading edge where the new chip of the sequence is sent, which in turn means that the ultra-sonic transmission is continuous and has no harmonics. This has advantages in the case where the frequency changes without the two being locked, in which case there can be instances (i.e. at a changeover) when the period of the ultra-sonic signal is longer than that of the lowest frequency or shorter than that of the highest frequency. By using the above two frequencies with a chip width of 2.5 ms, the ultrasonic transmitter is always transmitting, which in turn enables an advantageous signal to noise ratio to be achieved. In addition, this type of modulation has clearly defined changeover points, which make the distance finally calculated more accurate and facilitate noise discrimination.

An input of the digital switch 6 is connected to an output of a network 7 comprising a shift register and XOR gates for generating a maximal pseudo-random bit sequence in a manner which will be known to persons skilled in the art. The frequency of the ultra-sonic signal emitted by emitter 4 is determined by the pseudo-random bit sequence at an output of network 7, a logic high level corresponding to one of the frequencies, and a low level corresponding to the other. For example, in a 24 bit network, one XOR gate (not shown) may compare bits 17 and 22, and another XOR gate may compare bits 23 and 24. A third XOR gate compares the outputs of the other two XOR gates.

The network 7 has a series of twenty four outputs 8, each of which is connected to a respective input of a microcomputer 9 which receives the seed of the pseudo-random bit sequence, ie the series of data bits which are output from the shift register to the XOR gates of network 7 to generate the pseudo-random bit sequence, as will be understood by persons skilled in the art. The seed of the pseudo-random bit sequence is also modulated onto a radio frequency signal by radio transmitter 10 and emitted via antenna 11. An input of micro computer 9 is connected via a radio receiver 12 to a further antenna 13, which may be the same antenna as antenna 11, and the function of which will be described in detail below.

The receiver 3 includes an ultra-sonic receiver 14, to an output of which is connected a limiter 15. The output of limiter 15 is input to a phase locked loop frequency discriminator 16, the control voltage of which recovers the digital pseudo-random bit sequence modulated onto the transmitted ultra-sonic signal by comparing the average value of the control voltage to the instantaneous level of the control voltage of the phase locked loop. The output of frequency discriminator 16 is input to a micro computer 17 and to an integrator 18 which evaluates the amount of time spent in a logic high state compared to a logic low state during the time taken to send one bit of the pseudo-random bit sequence. The integrator 18 is then reset at the end of each measurement period, and the output from integrator 18 is also input to micro computer 17. A further input of micro computer 17 is connected via a radio receiver 19 to an antenna 20, and an output of micro computer 17 is connected via a radio transmitter 21 to an antenna 22, which may be the same as antenna 20, and the function of which will be described in detail below.

The operation of the distance measuring system 1 of FIG. 1 will now be described.

When a visually impaired person activates receiver unit 3, a radio frequency signal containing the access code for one or more transmitters 2 is emitted via radio transmitter 21 and antenna 22.

Each transmitter 2 has an energy save mode in which no signal is transmitted by emitter 4 or antenna 11, and the only power used is to power a single oscillator in the transmitter 2 in order to periodically enable radio receiver 12, for example once per second, to detect whether any radio signal is present. If a radio signal received on antenna 13 is detected by radio receiver 12, micro computer 9 is alerted to determine whether the radio signal incorporates an access code for the transmitter 2. If no access code is detected, the transmitter 2 remains in the energy save mode.

When the radio frequency signal containing the access code is detected at the transmitter by radio receiver 12 and the micro computer 9, each transmitter 2 which detects its own access code is then activated so that the micro computer 9 of each transmitter 2 transmits the seed of its particular pseudo-random bit sequence via radio frequency transmitter 10 and antenna 11, and also generates the pseudo-random bit sequence in network 7. The pseudo-random bit sequence is then input to digital switch 6 to select between oscillators 5 so that the frequency of the ultra-sonic signal emitted by emitter 4 is modulated according to the pseudo-random bit sequence. Emission of the radio frequency signal via antenna 11 and the ultra-sonic signal via emitter 14 are arranged by micro computer 9 to commence simultaneously. The rf signal also contains further modulation components for enabling synchronisation between the transmitter 2 and the receiver 3, as will be appreciated by persons skilled in the art.

The radio frequency signal transmitted via antenna 11 is received via antenna 20 and radio frequency receiver 19 which recovers the seed of the pseudo-random bit sequence and inputs it to micro computer 17. Similarly, the pseudo-random bit sequence modulated onto the ultra-sonic signal transmitted by transmitter 4 is recovered from the signal detected by detector 14 and is input to micro computer 17. By means of suitable software in micro computer 17, the time delay between receipt of the radio frequency signal at antenna 20 and the ultra-sonic signal at detector 14 is determined, which in turn indicates the time of propagation of the ultra-sonic signal between emitter 4 and receiver 14.

From this, the distance between transmitter unit 2 and receiver unit 3 can be determined.

The receiver unit 3 includes suitable display means (not shown) such as an audio display to indicate the distance measured to the user. Alternatively, or in addition, suitable pre-recorded information may be played to the user at the receiver unit 3 to indicate obstacles or the like, or an absolute position may be indicated by means of signals received at the receiver unit 3 from more than one transmitter unit 2. Such an arrangement may be used, for example, to alert the partially sighted user to the location of goods on the shelves of a supermarket. Also, by means of a suitable memory included in the receiver unit 3, route information may be built-up for subsequent use.

Referring now to FIG. 2a, a processor unit 23 is shown which in an alternative embodiment replaces the micro computer 17 of receiver unit 3. The processor 23 includes a twenty four bit shift register 24 for receiving at its input the seed of the pseudo-random bit sequence recovered from radio receiver 19. The shift register 24 has a series of 24 outputs which are connected to a network 25 of identical construction to the network 7 of the transmitter unit 2 of FIG. 1 such that the seed of the pseudo-random bit sequence is received in shift register 24 and passed to network 25 which re-creates the original pseudo-random bit sequence. A clock generator 26 is connected to network 25 and a shift register 27 so that an identical pseudo-random bit sequence to that generated in micro computer 9 of the transmitter unit 2 is generated in network 25 and input to shift register 27. In this way, the signal appearing at each output 28 of shift register 27 represents the pseudo-random bit sequence generated by network 25, delayed by successive intervals, each of which corresponds to the clock frequency of clock generator 26.

Figure 2B:
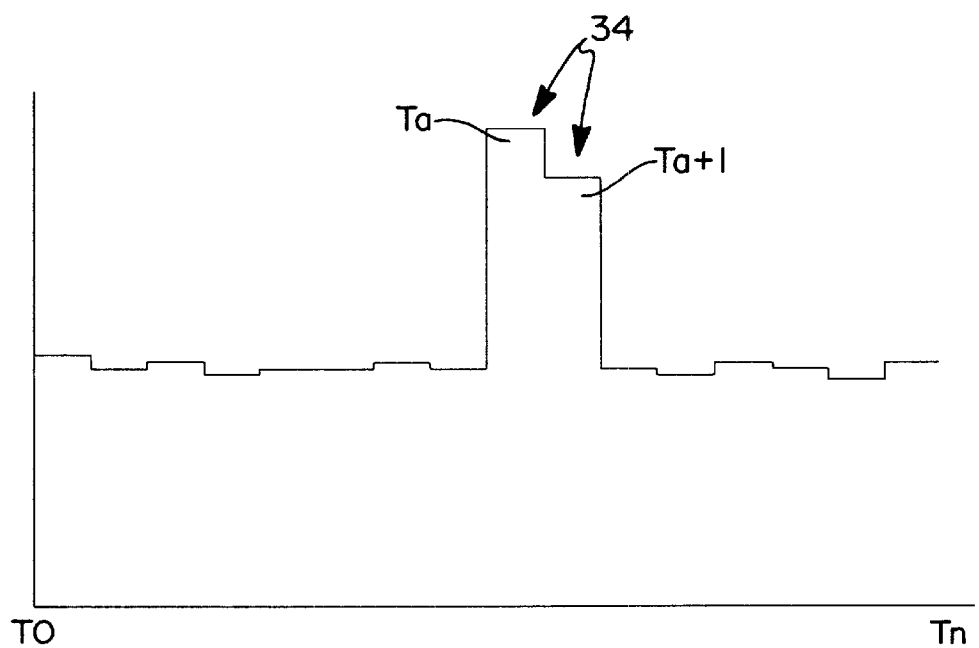

The demodulated sequence derived in receiver 3 is connected to the input of a non-inverting 29 and inverting 30 buffer amplifier, the outputs of which are connected to a comparator network 31, another input of which is sequentially connected to the outputs 28 of shift register 27 so that the comparator network 31 compares the input sequence and delayed sequence at each shift register output. The output of comparator network 31 is taken via a resistor/capacitor integrator 32 via multiplexer 33 to provide an output as shown in FIG. 2b, in which the two outputs 28 of shift register 27 having the largest degree of correlation with the signal recovered by receiver 3 are indicated by a pair of peaks 34.

The pair of peaks 34 indicates the two discrete time intervals between which the delay between receipt of the radio frequency signal at antenna 20 and the ultra-sonic signal at receiver 14 lies. This provides an indication of the time delay between receipt of the radio frequency and ultra-sonic signals, from which the distance between the transmitter unit 2 and receiver unit 3 can in turn be derived.

It will be appreciated by persons skilled in the art that the degree of correlation between the recovered signal and the outputs of the shift register 27 can also be ascertained by means of software.

It will be appreciated by persons skilled in the art that the above embodiments have been described by way of example only, and not in any limitative sense, and that various alterations and modifications are possible without departure from the scope of the invention as defined by the appended claims. In particular, the ultra-sonic signal emitted from emitter 4 of transmitter 2 may be rotated, either mechanically by spinning the ultra-sonic transmitter by means of a motor, or electronically by using a phased array of ultrasonic transmitters. If the rotation speed and absolute position of the rotating head are known at a fixed point in time, along with the seed of the binary sequence, a position vector to the transmitter, for example in the form of a distance and an angle, can be calculated. Also, more than one distance can be measured at the same time, which allows position to be determined rather than just distance.

What is claimed is:

1. A distance measuring method comprising the steps of:
   transmitting between at least one pair of first and second locations a respective first signal having a first propagation speed, wherein the or each said first signal includes a respective first modulation signal having a repetition period longer than a propagation time of said first signal between the at least one pair of the first and second locations, and wherein the or each said first signal is sequentially transmitted at two carrier frequencies, and said carrier frequencies are selected according to the respective first modulating signal;
   transmitting between the or each pair of first and second locations a respective second signal having a second propagation speed higher than the first propagation speed; and
   determining the distance between the first and second locations from the difference in propagation time between said first and second signals.

2. A method according to claim 1, further comprising the step of rotating the or each said first signal.

3. A method according claim 1, wherein the or each said first and second signal is emitted from a respective first location and detected at a respective second location.

4. A method according to claim 1, wherein the or each said second signal includes a respective second modulation signal associated with said first modulation signal.

5. A method according to claim 4, wherein the step of detecting the or each said second signal further comprises deriving the respective second modulation signal, generating at the respective second location a plurality of reference signals corresponding to the respective first modulation signals delayed by substantially constant time intervals relative to each other, and comparing a signal derived from the or each said detected first signal with each of the plurality of reference signals.

6. A method according to claim 5, wherein the step of generating said reference signals comprises generating respective first modulation signals at the or each second location and inputting each said first modulation signal to a respective shift register having a plurality of outputs.

7. A method according to claim 5, further comprising the step of determining a degree of correlation between the or each signal derived from the detected first signal and each reference signal.

8. A method according to claim 1, wherein the or each said first modulation signal is a pseudo-random bit sequence.

9. A method according to claim 8, wherein the time interval between successive bits of the pseudo-random bit sequence is a multiple of the periods corresponding to said respective carrier frequencies.

10. A method according to claim 1, further comprising the step of transmitting a third signal from at least one said second location to a said first location to activate emission of said first and second signal.

11. A method according to claim 1, wherein the or each said first signal is an acoustic signal, and preferably an ultrasonic signal.

12. A method according to claim 1, wherein the or each said second signal is an electromagnetic, optical or radio frequency signal.

13. A transmitter for a distance measurement system, the transmitter comprising:

a first emitter for emitting a first signal having a first propagation speed;

a second emitter for emitting a second signal having a second propagation speed higher than the first propagation speed;

first modulating means for modulating said first signal by a first modulation signal having a repetition period longer than a propagation time of the first signal from the first emitter to a detector; and control means for controlling the delay between emission of said first and second signals, wherein the first emitter in use emits the first signal sequentially at two frequencies selected according to the first modulation signal.

14. A transmitter according to claim 13, further comprising means for rotating said first signal.

15. A transmitter according to claim 13, further comprising signal generating means for generating the first modulating signal.

16. A transmitter according to claim 13, wherein the first modulation signal is a pseudo-random bit sequence.

17. A transmitter according to claim 16, wherein the time interval between successive bits of the pseudo-random bit sequence is a multiple of the periods corresponding to the respective two frequencies.

18. A transmitter according to claim 16, wherein the signal generating means comprises at least one shift register for receiving the seed of the pseudo-random bit sequence and a gate network connected to outputs of the shift register.

19. A transmitter according to claim 18, wherein the gate network comprises a plurality of XOR gates.

20. A transmitter according to claim 16, further comprising second modulating means for modulating the second signal with the seed of the pseudo-random bit sequence.

21. A transmitter according to claim 13, wherein the transmitter has an inactive mode in which said first and second signals are not emitted, and further comprises detector means for detecting a third signal and actuating emission of said first and second signals in response thereto.

22. A transmitter according to claim 13, wherein the first emitter comprises means for emitting an acoustic, and preferably an ultrasonic, signal.

23. A transmitter according to claim 13, wherein the second emitter comprises means for emitting an electromagnetic, optical or radio frequency signal.

24. A detector apparatus for a distance measuring system, the apparatus comprising:

a first detector for detecting a first signal having a first propagation speed, wherein the first detector in use detects a first modulation signal having a longer repetition period than a transmitter-detector propagation time or the first signal;

frequency discriminator means for detecting the first signal transmitted sequentially at two frequencies selected according to the first modulation signal;

a second detector for detecting a second signal having a second propagation speed higher than the first propagation speed; and means for determining a transmitter-detector distance from a time interval between detection of said first and second signals.

25. An apparatus according to claim 24, wherein the second detector in use detects a second modulation signal associated with the first modulation signal.

26. An apparatus according to claim 25, wherein the first modulation signal is a pseudo-random bit sequence, and the second modulation signal includes the seed of said pseudo-random bit sequence.

27. An apparatus according to claim 26, wherein the time interval between successive bits of the pseudo-random bit sequence is a multiple of the periods corresponding to said respective two frequencies.

28. An apparatus according to claim 24, wherein the frequency discriminator means comprises a phase locked loop.

29. An apparatus according to claim 24, wherein the determining means comprises processor means for generating a plurality of reference signals corresponding to the first modulating signal delayed by substantially fixed time intervals relative to each other and comparing the detected first modulating signal with each of the said plurality of reference signals.

30. An apparatus according to claim 29, wherein the processor means comprises a shift register for receiving a seed of the pseudo-random bit sequence and a gate network for generating the pseudo-random bit sequence therefrom.

31. An apparatus according to claim 30, wherein the gate network comprises a plurality of XOR gates.

32. An apparatus according to claim 29, wherein the processor means evaluates a degree of correlation between the first modulation signal and each of the plurality of reference signals.

33. An apparatus according to claim 29, wherein the processor means comprises a micro computer.

34. A distance measuring system comprising at least one transmitter according to claim 13, and at least one detector apparatus according to claim 24.

* * * * *

UNITED STATES PATENT AND TRADEMARK OFFICE
CERTIFICATE OF CORRECTION

PATENT NO.    : 6,404,703 B1
DATED         : June 11, 2002
INVENTOR(S)   : Christopher Simon Burrell It is certified that error appears in the above-identified patent and that said Letters Patent is hereby corrected as shown below:

Column 7,
Line 22, "S" should read -- 5 --.

Signed and Sealed this

Fourth Day of February, 2003

JAMES E. ROGAN
*Director of the United States Patent and Trademark Office*